Patented Feb. 11, 1941

2,231,471

UNITED STATES PATENT OFFICE 2,231,471

LAMINATED GLASS

Rowland Hill, Manchester, England, assignor to Imperial Chemical Industries Limited, a corporation of Great Britain No Drawing. Application May 3, 1938, Serial No. 205,723, which is a division of application Serial No. 645,318, December 1, 1932. Divided and this application November 16, 1939, Serial No. 304,721. In Great Britain December 2, 1931

4 Claims. (Cl. 49—92)

This invention relates to the manufacture of laminated glass and, more particularly, to the plastic used as the interlayer in laminated glass.

This application is a division of my copending application Serial No. 205,723, filed May 3, 1938, entitled "Polymerization products and manufacture thereof" which in turn is a division of my earlier application Serial No. 645,318, filed December 1, 1932, and patented May 17, 1938, United States Patent 2,117,321, "Manufacture of new polymerization products".

It has been proposed to use the polymerization products of methyl or ethyl acrylate or mixtures of the two in the manufacture of compound glass, and it has been proposed to use various other substances, for instance, a polymerized itaconic ester, a polymerized ethyl ester of crotonic acid, and polymerized vinyl esters not to mention such mixtures as contain cellulose esters.

Unsplinterable glass consists of a sandwich of an interlayer of transparent material between two sheets of common glass, the interlayer material acting also as a cement, or being fixed to the glass by a separate cementing medium. It is the interlayer thus cemented which prevents the glass from splintering when fractured, and a good interlayer material should be hard, tough, sufficiently elastic to draw back splintered glass, and should give an even surface, transparent, and colorless, and it should conserve these properties so long as the material is in use and over the range of temperatures usually covered by climatic changes.

Consequently to provide a suitable interlayer material is a problem the solution of which is only being reached by stages, and the proposals above referred to have not, in our experience, provided a fully satisfactory solution.

The present invention is directed particularly to the solution of this problem.

The hitherto unknown methyl methacrylate (methyl-methyl-acrylate) is converted on polymerization, for example, by the methods described as applicable to organic vinyl esters in British Specification No. 15,271/1914 into a very hard tough glassy mass, which has a conchoidal fracture and can be pulverized. Because of its hardness and lack of elasticity this material cannot be used by itself in the manufacture of unsplinterable glass, although it is so tough. Known methacrylates, and the alkyl esters of acrylic acid itself, on the other hand, all yield on polymerization either brittle masses or soft rubber-like flexible products.

According to the invention new polymerization products are made by subjecting to polymerization a mixture of the hitherto unknown methyl methacrylate and a suitable proportion of at least one polymerizable material and particularly polymerizable unsaturated esters and even more specifically those containing an ethylenic linkage conjugated with a multiple bonded carbon, i. e., $H_2C=C-C=x$ or $H_2C=C-C\equiv x$, or those containing a doubly bonded carbon directly attached to a negative group, such as esters of acrylic acid, e. g., methyl acrylate; or other esters of methacrylic acid, e. g., butyl methacrylate; vinyl esters, e. g., vinyl acetate, vinyl chloride, styrene, vinyl cyanide; itaconic esters, e. g., di-methyl itaconate. Interpolymers are also obtained in accordance with the invention by polymerizing methyl methacrylate with polymerizable materials such as acrolein, methyl vinyl ketone, synthetic resins in the initial stages of polymerization, e. g., high acid number polyhydric alcohol-polybasic acid condensation products, incompletely polymerized phenol formaldehyde resins, urea-formaldehyde resins, p-toluenesulfonamide-formaldehyde resins, etc.

The hitherto unknown methyl methacrylate may be obtained by treating methyl α-hydroxy-iso-butyrate with a dehydrating agent, e. g., phosphorus pentoxide, as more fully described in my U. S. Patent 1,980,483 granted November 13, 1932. It may also be prepared by the method described in the application of Donald J. Loder, filed February 8, 1932, Serial No. 593,411, i. e., by chlorination of isobutyric acid, esterification of the chlor-acid with methyl alcohol and dehalogenation of the chlor-ester. In the present specification the generally accepted term "methacrylate" is used as a convenient synonym for α-methacrylate (cf. von Richter's Organic Chemistry, translated by Spielmann, London, 1919, Vol. I., p. 297). Other methacrylates are obtained by similar means from the corresponding hydroxy-iso-butyric esters.

The polymerization is effected by subjecting the mixture to the action of radiant energy (heat and/or light), oxygen, or oxygen-containing substances, separately or together. Any of the polymerization promoting means known (cf. British Specification No. 15,271/1914) may be used, but I preferably use benzoyl or other peroxides. The polymerization may be effected in a solvent, e. g., toluene, and the operation may be carried out under pressure. The substance may also be emulsified and then polymerized.

The polymerization products so obtained are both hard and very tough. They are soluble in ester, ketone, and aromatic hydrocarbon solvents. In these as in other properties they differ from mere mixtures of the separately polymerized ingredients. The properties naturally vary according to the proportions of the ingredients but the relationships between properties and composition are not linear. Evidently polymerization takes place in such a way that the chains of monomer residues produced are mixed and the nature of the product depends on the particular way in which these mixed chains are formed.

When the interpolymers of the present invention are used as the interlayer in safety glass combinations they may form both interlayer and adhesive therefor or a separate adhesive may be used. As adhesives, gelatin, casein, cellulose derivatives, such as the acetate, nitrate, ethyl ether, etc., resins such as polyhydric alcohol-polybasic acid resins, dephenylol-propane-aldehyde resins, toluenesulfonamide-aldehyde resins, vinyl resins, etc., may be used. When no separate adhesive is used the interlayer is preferably caused to adhere to the glass layers by means of heat and pressure with or without the aid of added solvent and/or plasticizer. In general an interpolymer containing from 10-75% methyl methacrylate is preferred as an interlayer material. Mixtures of these interpolymers with natural or synthetic resins, cellulose derivatives, or other plastic materials may be used.

The invention is illustrated but not limited by the following examples in which the parts are by weight:

*Example I.*—One part of methyl methacrylate B.P. 100–101° C. and 3 parts of methyl acrylate B.P. 78–81° C. are mixed. 0.04 parts of benzoyl peroxide are added. The mixture is heated to 55–60° C. for 16 hours.

The resulting mass is very pale straw in color. It is moderately hard, elastic and very tough. It dissolves in such organic solvents as toluene, ethyl and butyl acetates, and glycol monoethyl ether. It may be rolled when warm (e. g. at 45–50° C.) into tough elastic sheets.

*Example II.*—Ten parts of methyl methacrylate B.P. 100–101° C. and 10 parts of ethyl acrylate B.P. 98–101° C. are mixed. 0.2 parts of benzoyl peroxide are added and the mixture is heated for 4 hours at 100° C.

The product is almost colorless and does not discolor on exposure to light. It is hard and tough. It may be milled on rolls like the product of Example I to give transparent tough sheets. It is soluble in organic solvents and compatible with nitrocellulose.

*Example III.*—One part of methyl methacrylate and 3 parts of n-butyl methacrylate are mixed. 0.04 parts of benzoyl peroxide are added, and the mixture is heated for 8 hours at 100° C.

The product is moderately hard and tough, and resembles the products of the preceding examples. n-butyl methacrylate may be obtained from n-butyl α-hydroxy-iso-butyrate by dehydration e. g., with phosphorus pentoxide.

*Example IV.*—One part of vinyl acetate, 2 parts of methyl methocrylate and 0.015 parts of benzoyl peroxide are mixed and heated at 65° C. Polymerization begins after about two hours, and is substantially complete after 18 hours. The new polymerization product obtained is a hard, tough, colorless product with a high softening point.

*Example V.*—Three parts of methyl methacrylate and one part of acrylic nitrile are mixed and 0.04 parts of benzoyl peroxide are added. The mixture is heated at 60° C. for 18 hours.

The new polymerization product so obtained is pale yellow in color. This is hard, tough and resilient, and possesses high tensile strength and impact resistance.

*Example VI.*—Two parts of methyl methacrylate are mixed with one part of methacrylic nitrile, 0.03 parts of benzoyl peroxide are added and the mixture heated at 60° C. for 20 hours, then at 100° C. for 9 hours.

The product is pale straw in color, transparent, hard and tough.

*Example VII.*—One part of methyl methacrylate and one part of methyl acrylate are mixed. 0.006 parts of sodium perborate and 0.03 parts of acetic anhydride are added and the mixture is then heated at 60° C. for 30 hours, when polymerization appears to be complete.

The so obtained polymerization product is hard, tough, flexible, transparent and colorless.

*Example VIII.*—Ten parts of methyl methacrylate and 15 parts of methyl acrylate are mixed with 0.12 parts of benzoyl peroxide, and the mixture is heated for 4 hours at 120° C. and then for 4 hours at 130° C. under a pressure of 300 lbs. per sq. inch.

The resulting interpolymer is colorless, transparent, moderately elastic and very tough. It can be rolled into sheets which are then well suited for use in the manufacture of compound safety glass.

*Example IX.*—A mixture of ten parts of methyl methacrylate and 15 parts of methyl acrylate containing 0.25 parts of benzoyl peroxide is added slowly with rapid stirring to a solution of 1 part of sodium iso-propylnaphthalene-sulfonate and 0.5 parts of Turkey-red oil in 100 parts of water at 25° C.

The emulsion produced is heated for 12 hours at 60° C. and cooled. One part of aqueous hydrogen peroxide (20 vols.) is then added, and the mixture is heated again, at 80° C. for a further 4 hours.

After cooling, the emulsion is coagulated by pouring it with rapid stirring into 250 parts of 3.5% hydrochloric acid. The white coagulum is filtered off, washed free from acid, and dried.

The dried product is soluble in a wide range of common organic solvents and is compatible with nitrocellulose.

*Example X.*—Ten parts of methyl methacrylate and 10 parts of methyl vinyl ketone are mixed with 25 parts of butyl acetate and 0.1 part of benzoyl peroxide and heated for 6 hours under a reflux condenser. The resulting product is a viscous, transparent, very pale yellow mass, soluble in additional solvent and thus suitable in the preparation of safety glass.

*Example XI.*—Ten parts of methyl methacrylate and 10 parts of vinyl acetate are mixed with 0.1 parts of benzoyl peroxide and heated for 10 hours under super-atmospheric pressure at 80° C. The product is a water white, transparent, hard, tough solid, soluble in ester, ketone and aromatic hydrocarbon solvents.

*Example XII.*—Two parts of methyl methacrylate and 8 parts of vinyl chloride are mixed with 20 parts of toluene and 0.05 parts of benzoyl peroxide and heated for 12 hours, at 105° C. in a closed container or passed under pressure through a tube heated to 105° C. at such a rate that they remain in the heated zone for the same length of time. The product is transparent, slightly yellow, and soluble in aromatic hydrocarbon solvents.

Polymerization under the influence of heat and/or light, without a catalyst, such as benzoyl peroxide, is slower, requiring at least four times as much as the catalyzed polymerization.

As many apparently widely different embodiments of this invention may be made without departing from the spirit and scope thereof, it is to be understood that the invention is not limited to the specific embodiments thereof except as defined in the appended claims.

I claim:

1. Laminated glass comprising a sheet of glass and, bonded thereto, a plastic sheet comprising an interpolymer of methyl methacrylate and another derivative of methacrylic acid.

2. Laminated glass comprising a sheet of glass and, bonded thereto, a plastic sheet comprising an interpolymer of methyl methacrylate and another ester of methacrylic acid.

3. Laminated glass comprising a sheet of glass and, bonded thereto, a plastic sheet comprising an interpolymer of methyl methacrylate and another lower alkyl ester of methacrylic acid.

4. Laminated glass comprising a sheet of glass and, bonded thereto, a plastic sheet comprising an interpolymer of methyl methacrylate and n-butyl methacrylate.

ROWLAND HILL.